(12) United States Patent
Gerstein

(10) Patent No.: US 6,227,004 B1
(45) Date of Patent: May 8, 2001

(54) PORTABLE AIR CONDITIONER/BEVERAGE CONTAINER

(75) Inventor: Mark S. Gerstein, Ames, IA (US)

(73) Assignee: Cool Guyz Inc., Ames, IA (US)

( * ) Notice: Subject to any disclaimer, the term of this patent is extended or adjusted under 35 U.S.C. 154(b) by 0 days.

(21) Appl. No.: 09/432,349

(22) Filed: Nov. 2, 1999

(51) Int. Cl.[7] .................................................... F25D 3/02
(52) U.S. Cl. ............................. 62/421; 62/423; 62/457.3
(58) Field of Search ........................... 62/423, 421, 457.3

(56) References Cited

U.S. PATENT DOCUMENTS

| 1,081,595 | 12/1913 | Elson . | |
|---|---|---|---|
| 1,922,790 | 8/1933 | Alger | 62/133 |
| 2,159,741 | 5/1939 | Kettering et al. | 62/129 |
| 2,802,347 | 8/1957 | Marcus | 62/133 |
| 2,959,938 | 11/1960 | Giardini | 62/384 |
| 3,961,496 | 6/1976 | Ku | 62/459 |
| 4,860,556 | 8/1989 | Hammett | 62/406 |
| 4,910,975 | 3/1990 | Derby | 62/372 |
| 5,062,281 | 11/1991 | Oliphant et al. | 62/457.1 |
| 5,129,238 * | 7/1992 | Schwartz et al. | 62/457.3 |
| 5,159,819 | 11/1992 | Wong | 62/419 |
| 5,197,301 | 3/1993 | Holcomb | 62/457.1 |
| 5,590,542 * | 1/1997 | Wang | 62/457.3 |
| 5,857,350 | 1/1999 | Johnson et al. | 62/314 |
| 5,860,293 | 1/1999 | Piro | 62/420 |
| 6,085,543 * | 7/2000 | Su | 62/457.3 |
| 6,119,477 * | 9/2000 | Chan | 62/406 |

* cited by examiner

*Primary Examiner*—William Doerrler
*Assistant Examiner*—Mark Shulman
(74) *Attorney, Agent, or Firm*—Zarley, McKee, Thomte, Voorhees & Sease

(57) ABSTRACT

A portable air conditioner/beverage container includes a container having top and bottom ends, a side wall, an air intake opening, and a cool air outlet. Within the container, there is a separation wall. A first space between the separation wall and the side wall defines an air intake region. The air intake region is in fluid communication with the air intake opening. A second space between the side wall and the separation wall defines a cold substance chamber. A blower is in fluid communication with the cool air outlet. A power supply is coupled to the blower. The blower pulls air in through the air intake opening, down through the air intake region, and around the separation wall. Air flows up through the cold substance chamber, through the cool air outlet, where it is expelled onto a user.

19 Claims, 11 Drawing Sheets

PORTABLE AIR CONDITIONER/BEVERAGE CONTAINER

BACKGROUND OF THE INVENTION

1. Field of the Invention

The present invention relates to a portable air conditioner/beverage container. More particularly, the present invention relates to a device that utilizes a fan to pull ambient air through a container that contains a cold substance and blows the cooled air out onto the user of the present invention.

2. Problem in the Art

A portable air-conditioning device is generally disclosed in U.S. Pat. No. 5,062,281. While this device aims to function as an air conditioner, it does not have any means to ensure that air passes through a cooling substance, such as ice, before being expelled onto the operator. A lot of the hot air that enters into this device is also expelled as hot air. Air is not sufficiently cooled before exiting onto a user of the device. A need in the art exists for a portable air conditioner that controls air flow so as to ensure efficient operation of the air conditioner. A portable air conditioner that controls the flow of air to ensure efficient cooling is disclosed by the present invention.

In addition, there is a need in the art for a device which can function as both a portable air conditioner and a beverage container. A device of this type would allow a spectator at a sporting event to enjoy a cool beverage while also being cooled. A device of this type is disclosed by the present invention.

FEATURES OF THE INVENTION

A general feature of the present invention is the provision of a portable air conditioner/beverage container which solves problems and deficiencies in the art.

Another feature of the present invention is the provision of a portable air conditioner which can also function as a beverage container.

A third feature of the present invention is the provision of a portable air conditioner/beverage container which pulls a stream of air through ice and then blows the cooled air out.

Another feature of the present invention is a portable air conditioner that allows for efficient cooling of the air.

Still another feature of the present invention is the provision of a portable air conditioner that controls air flow within the air conditioner.

Another feature of the present invention is the provision of a portable air conditioner/beverage container that keeps the ice separate from the beverage.

Yet another feature of the present invention is the provision of a portable air conditioner which has a hinged lid to allow for easy refill of the ice within the container.

Another feature of the present invention is a portable air conditioner which has an air entry vent to control the flow of air through the portable air conditioner.

Another feature of the present invention is a removable insert that allows for easy cleaning of the device.

Another feature of the present invention is the provision of a portable air conditioner/beverage container that is economical, easy to use, and efficient in operation.

These and other features and advantages of the present invention will be apparent from the following detailed description and claims taken in conjunction with the accompanying drawings.

SUMMARY OF THE INVENTION

In a first embodiment, a portable air conditioner/beverage container includes a container that has a side wall, a closed bottom, a top, an air intake opening and a cool air outlet. Within the container there is a separation wall. A first space between the separation wall and the side wall defines an air intake region. A second space between the separation wall and the side wall defines a cold substance chamber. A blower is connected to a power supply. Air enters through the air intake opening and down through the air intake region. The air then flows around the separation wall and up through the cold substance chamber. Finally, the air is forced out by the blower, exiting the container through the cool air outlet.

In a second embodiment, a portable air conditioner/beverage container is comprised of a container having top and bottom ends and a side wall. The container also has a beverage opening, an air intake opening, and a cool air outlet. Within the container, there is a barrier wall. The space between the barrier wall and the side wall defines a beverage compartment. The barrier wall prevents melted ice from infiltrating a beverage. There is also a separation wall in the container to control air flow. The air intake opening is in fluid communication with an air intake region. A cold substance chamber in the container is in fluid communication with the cool air outlet. Air enters through the air intake opening, passes through the air intake region, and around the separation wall. From there, air passes through the cold substance chamber and up through the cool air outlet. A blower expels the cooled air onto a user.

DETAILED DESCRIPTION OF AN EXEMPLARY EMBODIMENT

The present invention will be described as it applies to an exemplary embodiment. It is not intended that the present invention be limited to the described embodiments. It is intended that the invention cover all alternatives, modifications, and equivalents which may be included within the spirit and scope of the invention.

Figure 1:
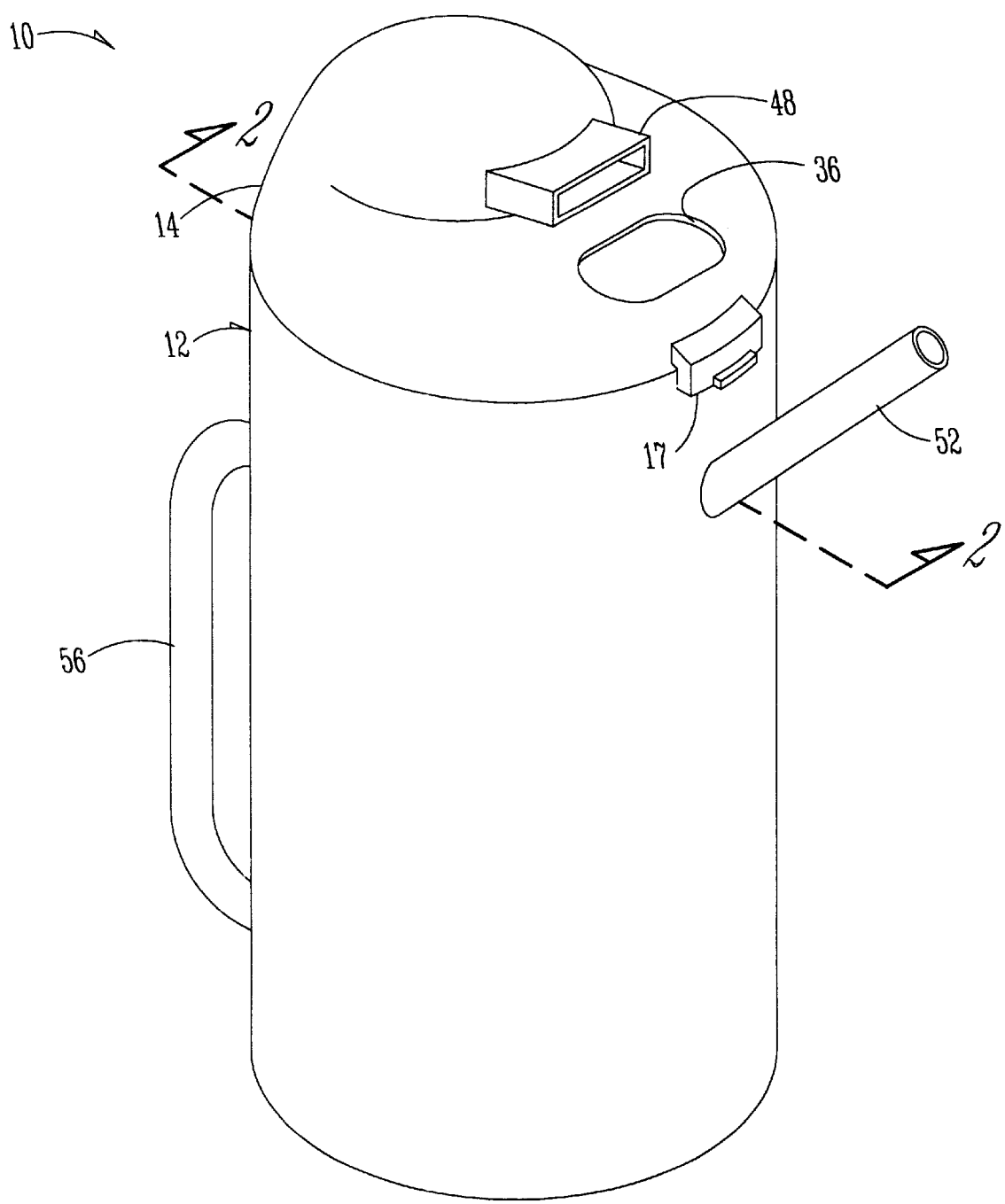
FIG. 1 is a perspective view of a portable air conditioner/beverage container according to the present invention.

A perspective view of a portable air conditioner/beverage container according to the present invention is shown in FIG. 1. The portable air conditioner is generally referenced by the numeral 10. The portable air conditioner 10 is comprised of a container 12 and a lid 14 that is connected to the container 12 through a hinge connection 16. Snap closure 17 secures the lid 14 to the container 12. The container 12 can be of any size, shape, or material, but typically is plastic and holds between 16 and 64 ounces. A piece of rubber 19 (FIG. 2) encircles the top 18 of the container 12 to form a seal between the container 12 and the lid 14. Other materials, such as silicone, could be used as a sealant material.

Figure 2:
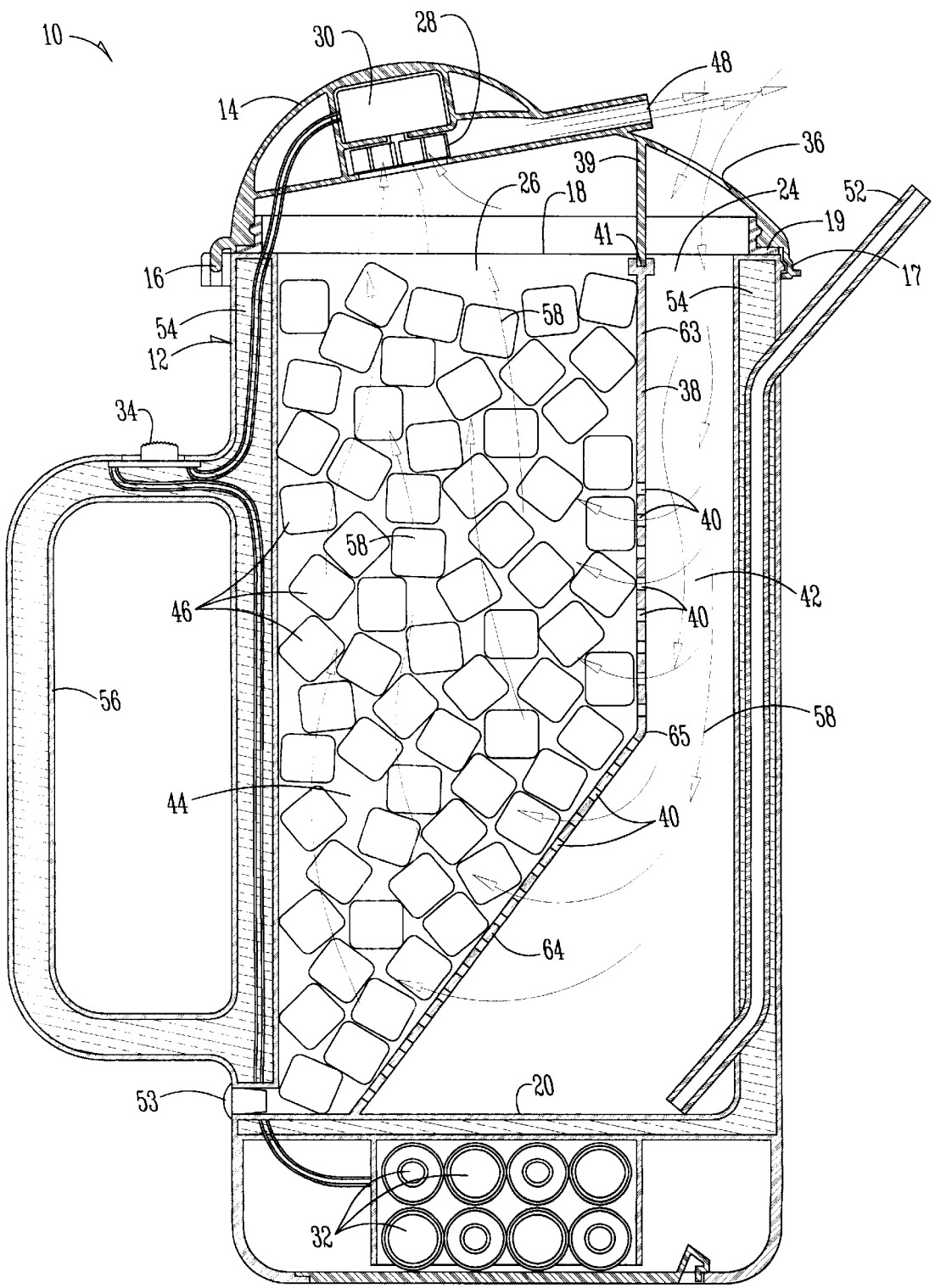
FIG. 2 is a cross-sectional view taken along line 2—2 of FIG. 1.
Figure 3:
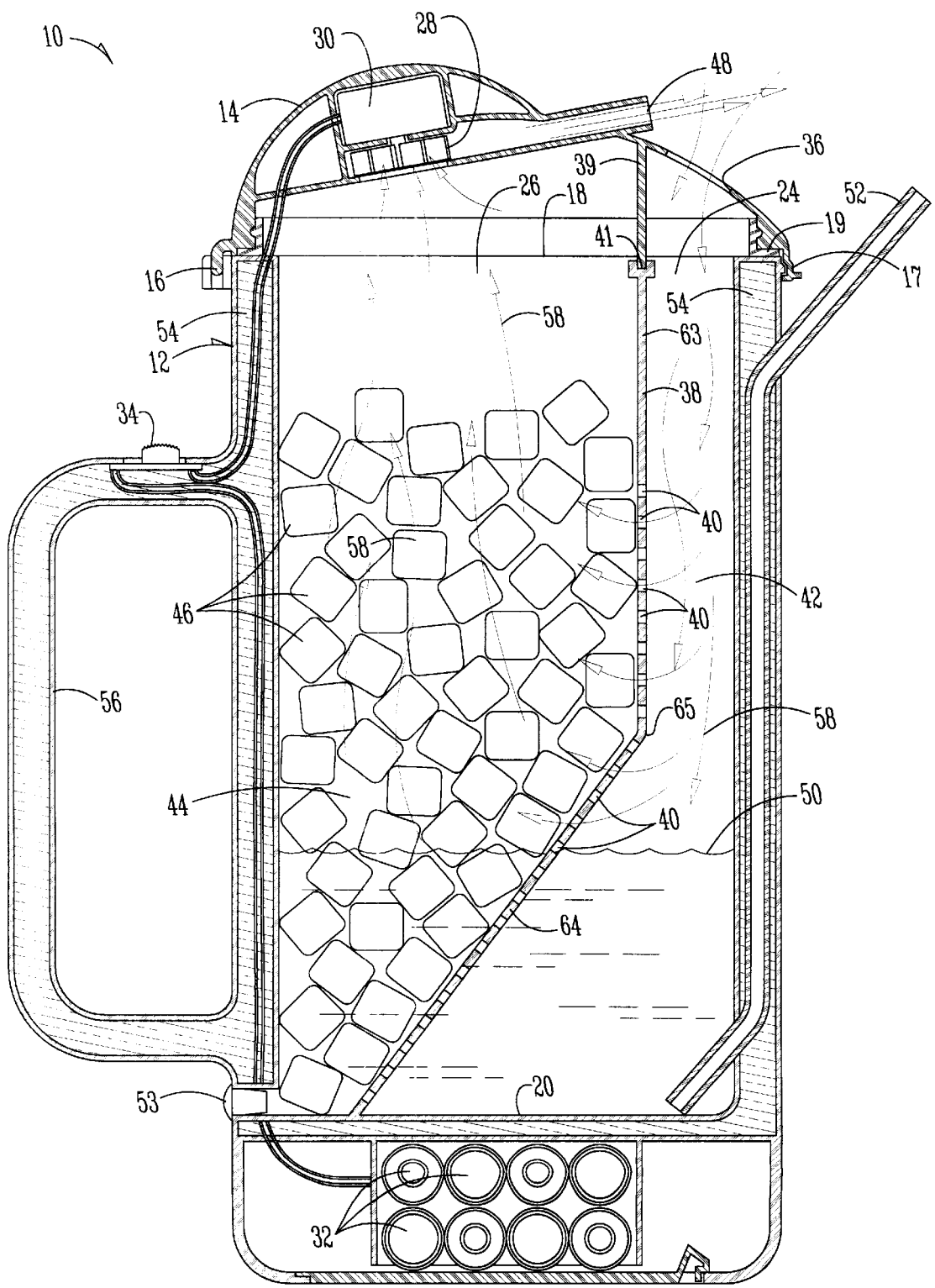
FIG. 3 is a cross-sectional view similar to FIG. 2, shown with a beverage in the container.
Figure 4:
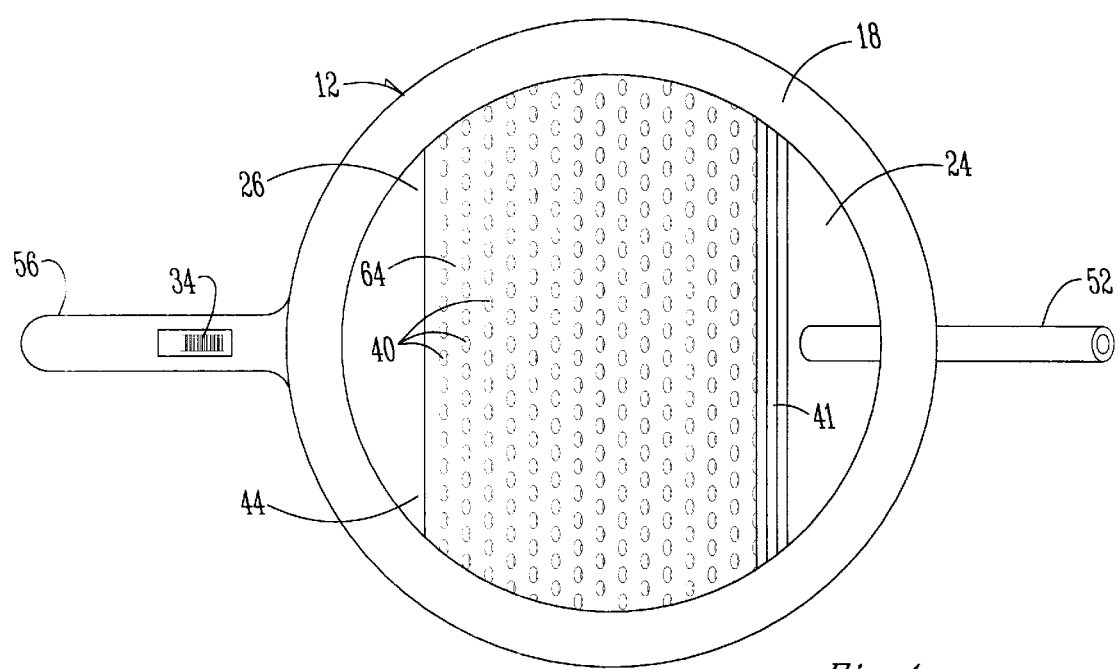
FIG. 4 is a top plan view of the portable air conditioner/beverage container of FIG. 1, shown with the lid removed.

A cross-sectional view of the portable air conditioner 10 is shown in FIG. 2. The container 12 has a top 18, a bottom 20, and a side wall 54. The container bottom 20 is closed. The container top 18 has an air intake opening 24. The air intake opening 24 is in fluid communication with an outside air intake vent 36 located in the lid 14. Another opening 26 in the top 18 serves as a cool air outlet 26.

Within the container 12, there is a separation wall 38. The separation wall 38 can be any material, but preferably is plastic. At the top of the separation wall 38 is a receiving groove 41. The wall extension 39 fits into the receiving groove 41. When the lid 14 is closed, the separation wall 38 and wall extension 39 form a seal at the receiving groove 41. The receiving groove 41 could optionally be lined with rubber to form a better seal between the separation wall 38 and the wall extension 39.

The separation wall 38 has a series of holes 40 on both the bottom 64 of the wall 38, and on the upright part 63 of the wall 38, that serve as vents in the separation wall 38. The holes 40 are small enough such that the bottom 64 of the wall 38 holds the ice 46, preventing the ice 46 from mixing with the beverage 50 on the air intake side. The beverage 50 can pass through the holes 40 and mix with the ice 46 in the cold substance chamber 44. The portable air conditioner will function even if the bottom 64 of the wall 38 is not angled such that it hold the ice 46. However, the ice 46 would mix with the beverage 50, watering down the beverage 50 and possibly causing the ice 46 to melt too quickly.

A first space 42 between the separation wall 38 and the side wall 54 defines an air intake region 42. A cold substance chamber 44 is defined by a second space between the separation wall 38 and the side wall 54. Within the cold substance chamber 44, any substance that has a temperature that is less than the ambient air temperature could serve as a coolant. The cold substance that is shown in FIG. 2 is ice 46. Ice 46 would generally be the cold substance of choice because of its ready availability. However, other cold substances could be used as long as the temperature of the cold substance is less than the ambient air temperature. Heat is exchanged between the ice 46 and the air as it flows through the cold substance chamber 44 cooling the air down before it is expelled onto an operator.

The air flow through the portable air conditioner 10 is shown by the arrows 58 in FIG. 2. Ambient air from the outside enters into the air intake vent 36 located in the lid 14. The air intake vent 36 is in fluid communication with both the air intake opening 24 and the air intake region 42. The air flows through the air intake opening 24. From there, the air flows through the air intake region 42. The air flows through the holes or vents 40 in the separation wall 38. If the bottom 64 of the separation wall 38 is removed, the air would simply flow underneath the separation wall 38, through the space between the separation wall and the bottom 20 of the container 12. After the air passes through the vents 40, it flows through the cold substance chamber 44 where it is cooled by the ice 46. It then flows out through the cool air outlet opening 26 and is forced out by the fan 28 through the cool air vent 48.

Within the lid 14 is housed a fan 28 having a fan motor 30. The fan 28 could be any type of fan. Preferably, the fan 28 is a squirrel cage type of fan. In the embodiment shown in FIGS. 1–4, the fan is oriented such that air is pulled up through the cold substance chamber 44 and blown out through the cool air vent 48. However, the orientation of the fan could be reversed such that it would pull air in through cool air vent 48 and blow the air down through the cool air opening 26, down through the cold substance chamber 44 and back out through the outside air intake vent 36. In other words, the fan could be situated such as to reverse the air flow while not departing from the present invention. It should be noted that situating the fan to blow air out, rather than pulling air in, is more effective because cold air is expelled at a higher rate when the fan blows outward.

The fan motor 30 is powered by a battery pack 32. The battery pack 32 is conventional. As shown in FIG. 2, the battery pack is comprised of 8 AAA batteries connected in series. Other power sources could be used. The battery pack 32 is operatively connected to the fan motor 30. The on/off switch 34 is positioned between the battery pack 32 and the fan motor 30. The on/off switch 34 allows the operator to have control over the operation of the fan 28 and fan motor 30.

The portable air conditioner 10 can also function as a portable air conditioner/beverage container. In the example shown in FIGS. 1–4, a straw 52 is molded into the side wall 54 of the container 12. The straw 52 is in fluid communication with an interior portion of the container 12. Other mechanisms could be used to allow for drinking of the beverage 50.

Optionally, the side wall 54 could be insulated. Insulation lengthens the time in which ice 46 remains in a solid form, increasing the length of time that the portable air conditioner 10 could be used before an ice refill was required. The drain plug 53 is an optional feature that allows for easy draining of excess liquid. The handle 56 is another optional feature that makes the portable air conditioner easier to transport.

Figure 5:
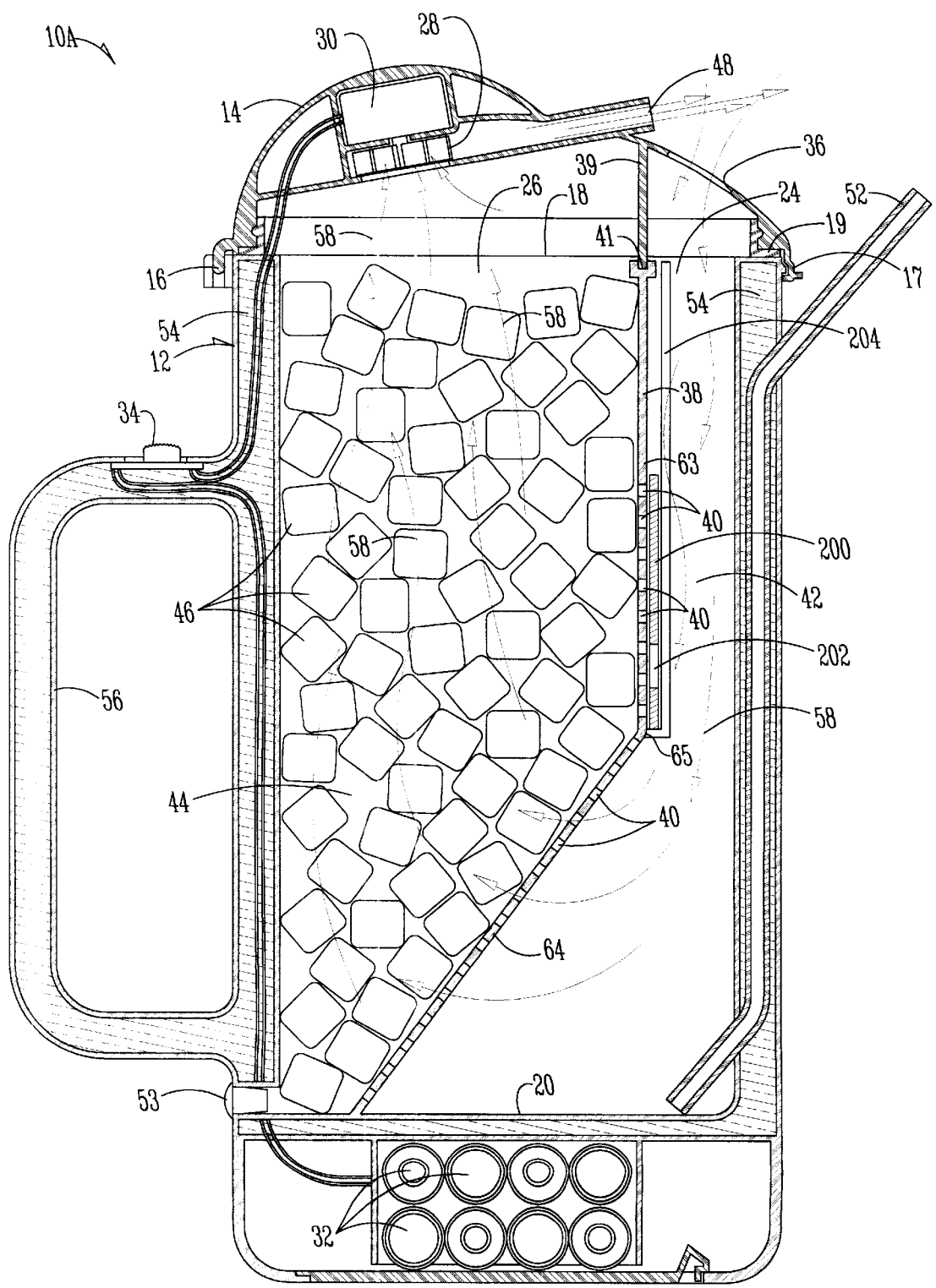
FIG. 5 is a cross-sectional view of a second embodiment, showing the vent blocking slide piece.
Figure 6:
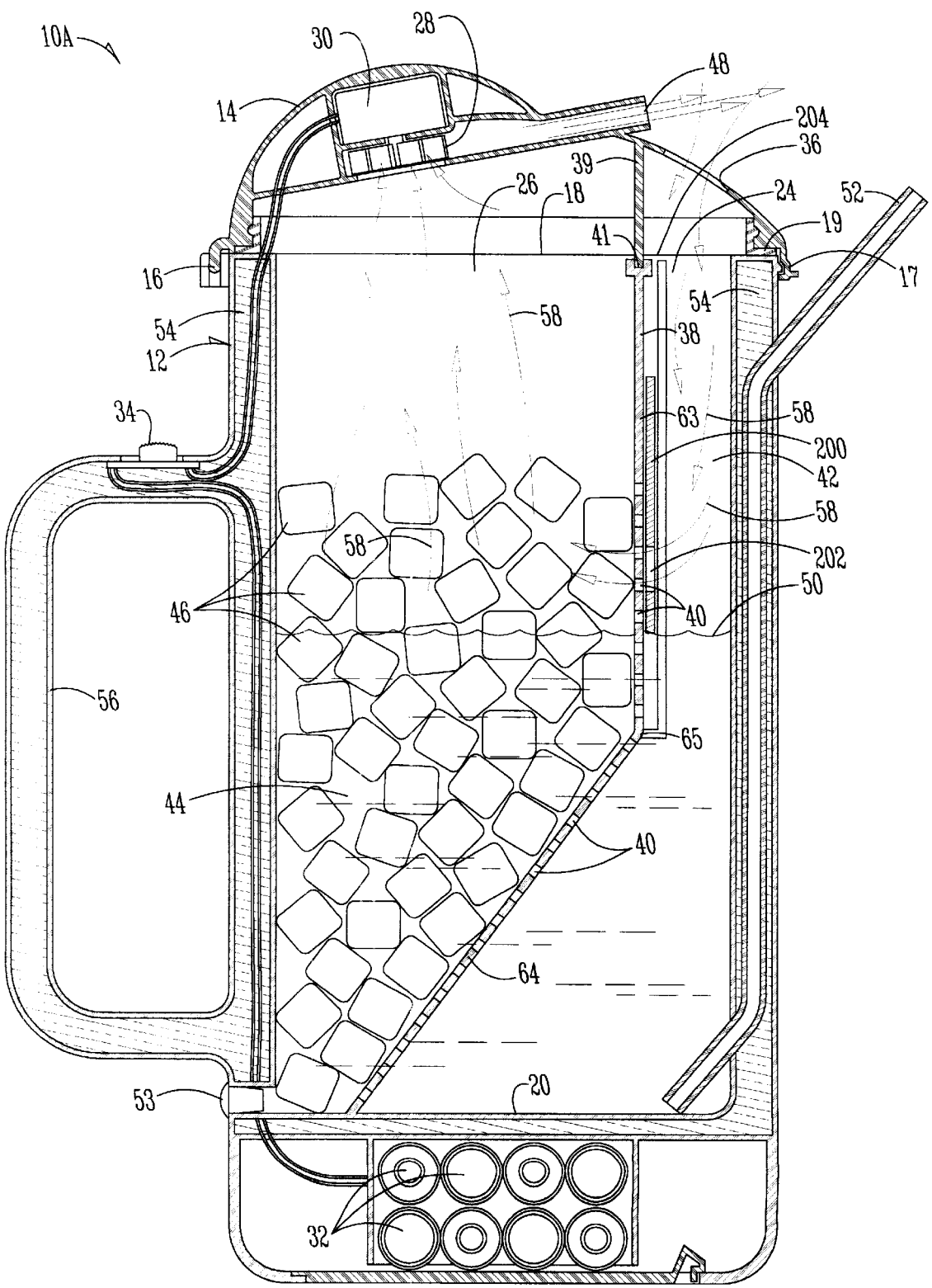
FIG. 6 is a cross-sectional view similar to FIG. 5, showing a change in position of the vent blocking slide piece due to a rise in the beverage level.

FIGS. 5 and 6 show cross-sectional views of a portable air conditioner/beverage container 10A that utilizes a vent blocking slide piece 200. The slide piece 200 has holes 202. The slide piece 200 is held next to the upright part 63 of the separation wall 38 by a lip 204. The slide piece 200 can move up and down in the lip 204. Preferably, the slide piece 200 is made of a material that floats. Alternatively, a float could be connected to the slide piece. As can be seen by a comparison of FIGS. 5 and 6, when the beverage level 50 is above the bottom 64 of the separation wall 38, the slide piece 200 floats upward with the beverage 50. The slide piece 200 covers most of the vent holes 40 in the upright portion 63 of the separation wall 38. The holes 202 in the slide piece 200 uncover the lowest vent holes 40 that are not covered by the beverage 50. The slide piece 200 forces air 58 through the lowest unblocked holes 40, helping to ensure that air 58 travels through the greatest volume of ice 46 possible before being expelled by the fan 28. When the beverage level is below the elbow 65 in the separation wall 38, the slide piece 200 blocks all, or almost all, of the vents 40 on the upright portion 63 of the separation wall 38.

Figure 7:
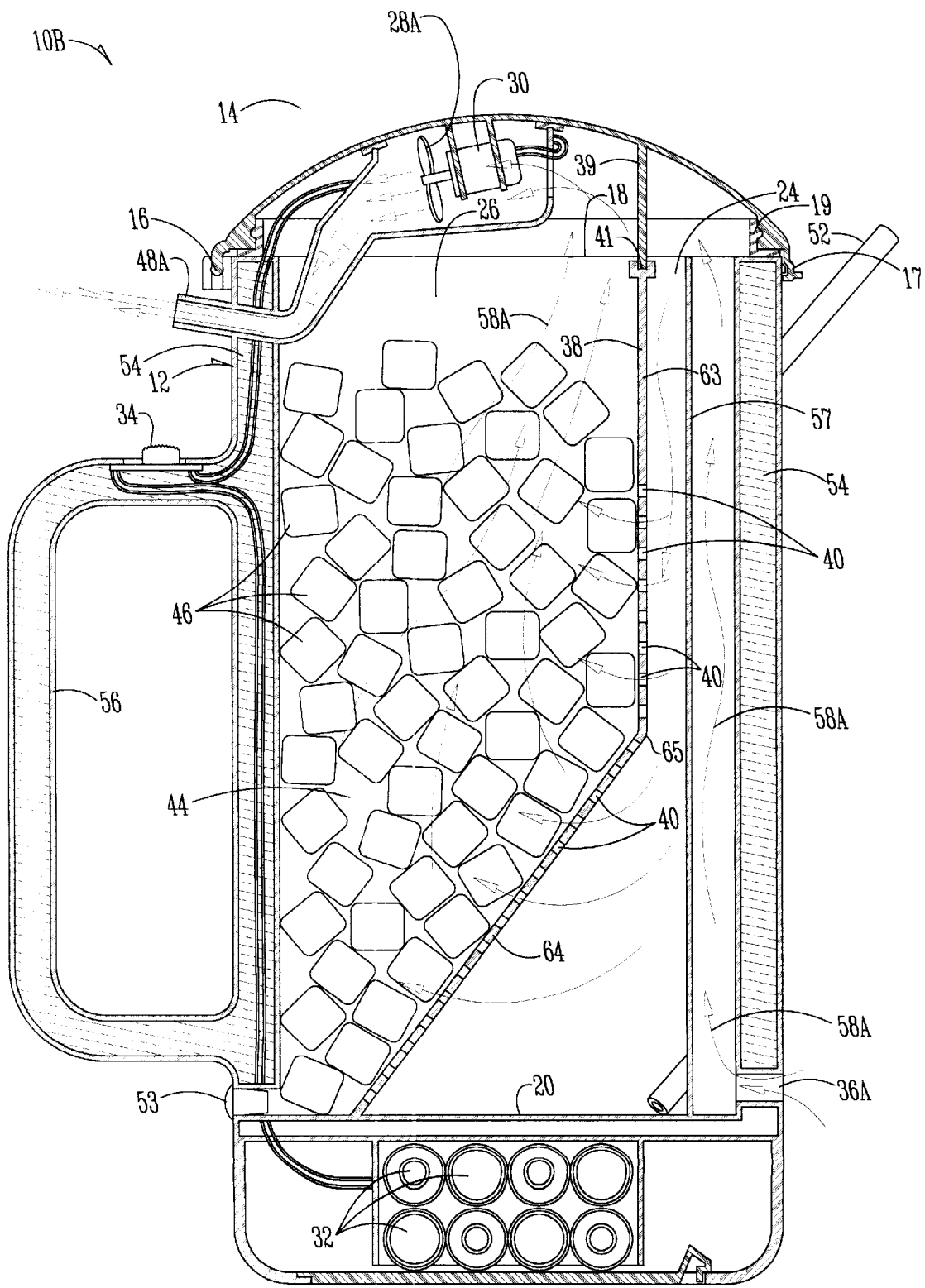
FIG. 7 is a cross-sectional view of a third embodiment according to the present invention, wherein the position of the air intake opening and cool air vent have changed.

A cross-sectional view of a third embodiment of the portable air conditioner/beverage container 10B is shown in FIG. 7. The portable air conditioner 10B of FIG. 7 is nearly identical to that disclosed in FIGS. 1–6. However, in FIG. 7 the locations of the air intake vent 36A and the cool air vent 48A have changed. The embodiment in FIG. 7 shows the use of a blade type fan 28A instead of a squirrel cage fan. The flow of air is shown by arrows 58A. Air enters through air intake vent 36A, passes through holes 40 in the separation wall 38, through the ice 46, and is blown out through the cool air vent 48A by the fan 28A. Wall 57 prevents liquid from leaving through the air intake vent 36A.

Figure 8:
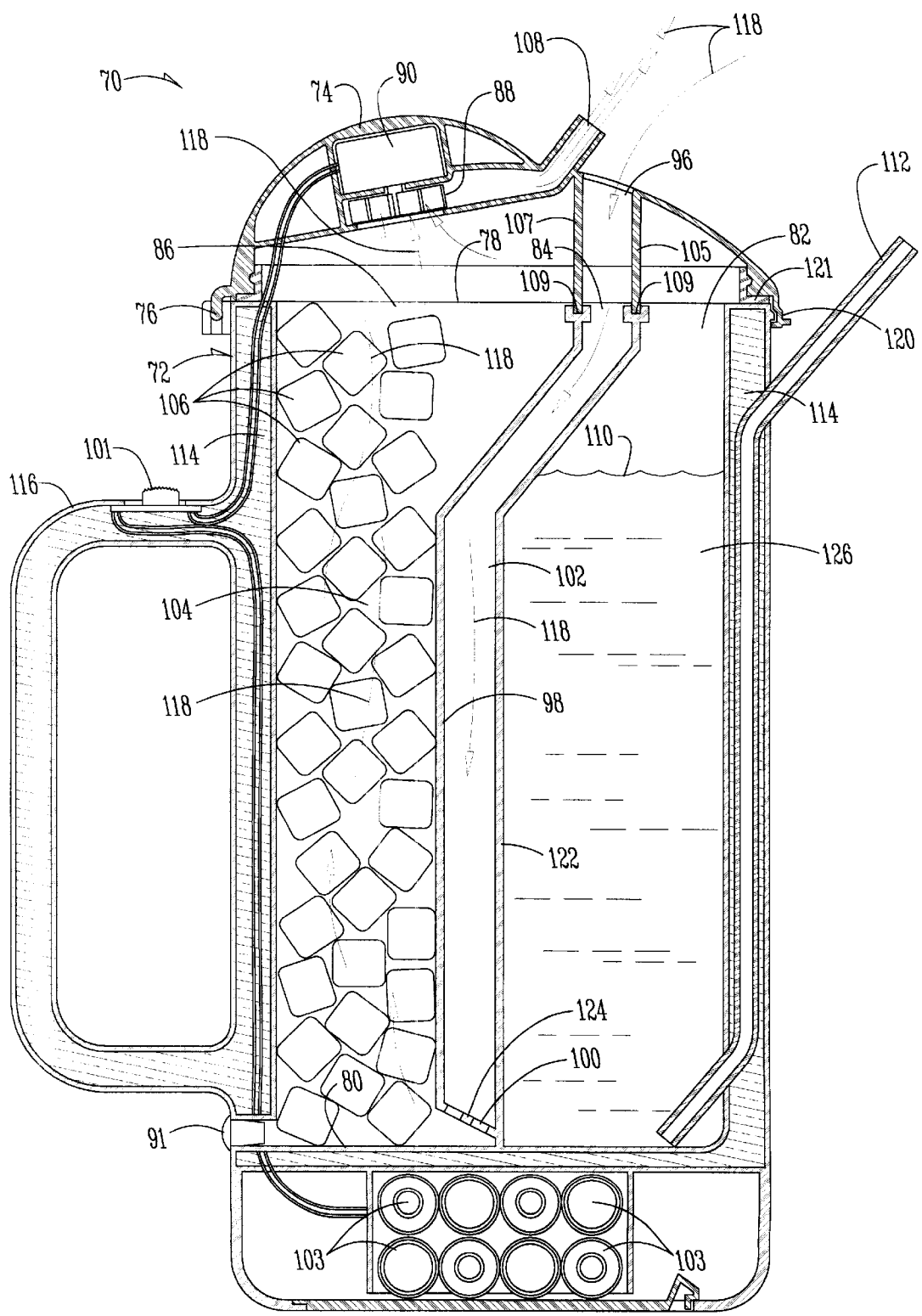
FIG. 8 is a cross-sectional view of a fourth embodiment according to the present invention, showing a separate cold substance chamber and beverage compartment.

FIG. 8 shows a cross-sectional view of a fourth embodiment according to the present invention. The portable air conditioner/beverage container 70 of FIG. 8 keeps the beverage 110 isolated from the ice 106. This embodiment is particularly useful when the beverage 110 is beer. When the ice 106 melts, it won't water down the beer 110. The operation of the portable air conditioner 70 is substantially the same as the operation of the embodiment disclosed in FIGS. 1–7.

A lid 74 is connected to the container 72 via hinge 76. Snap closure 120 secures the lid 74 to the container 72. The container 72 has a closed bottom 80, a cylindrical side wall 114, and a top 78. Preferably, the side wall 114 is insulated. Within the top 78 there is a beverage intake opening 82. The beverage 110 is poured into the container 72 through the beverage intake opening 82. A piece of rubber 121 around the top 78 of the container 72 forms a seal between the container 72 and the lid 74.

In the interior of the container, there is a barrier wall 122. The barrier wall 122 prevents melted ice 106 from infiltrating the beverage 110. The barrier wall 122 has a receiving groove 109 at the top of the barrier wall 122. A barrier wall extension 105 located in the lid 74 fits into the receiving groove 109, forming a seal between the beverage compartment 126 and the air intake region 102. Space between the barrier wall 122 and the side wall 114 defines a beverage compartment 126. Preferably, the barrier wall 122 is a thin membrane to allow the ice 106 to cool the beverage 110. A straw 112 is molded into the side wall 114. The straw 112 is in fluid communication with the beverage compartment 126.

Also located in the interior of the container 72 is a separation wall 98. There is a receiving groove 109 at the top of the separation wall 98. A separation wall extension 107 fits into the receiving groove 109, forming a seal between the air intake region 102 and the cold substance chamber 104. The separation wall 98 is spaced apart from the barrier wall 122. The space between the barrier wall and the separation wall 98 defines an air intake region 102. The air intake region 102 is in fluid communication with the ambient air opening 84 in the top 78 of the container 72. The separation wall 98 has holes or vents 100 at the bottom 124 of the wall 98. There could also be vents along the "upright" portion of the wall. Both the vents 100 and the bottom 124 of the wall 98 could be eliminated as long as there was some space between the separation wall 98 and the bottom 80 of the container 72 to allow for air flow. The space between the separation wall 98 and the side wall 114 defines a cold substance chamber 104. In this example, ice 106 is the cold substance of choice. However, other cold substances could be utilized. The drain plug 91 allows melted ice to be removed while not having to dump out the beverage 110 at the same time.

Within the lid 74, there is an outside air intake vent 96. The outside air intake vent 96 is in fluid communication with the ambient air opening 84. The outside air intake vent 96 is positioned such that it is also in fluid communication with the air intake region 102.

A fan 88 and fan motor 90 are housed within the lid 74. The fan motor 90 is connected to a battery pack 103. Power supplies other than a battery pack 103 could be utilized. An on/off switch 101 is positioned between the battery pack 102 and the fan motor 90. The on/off switch 101 allows for control of the operation of the fan 88.

The direction of air flow is shown by arrows 118. Air enters through the outside air intake vent 96 and passes through the ambient air opening 84 into the air intake region 102. The air then moves through the holes 100 and up through the ice 106. The air is pulled through the cool air outlet 86 and expelled out through the cool air vent 108. The fan 88 forces the air out through the cool air vent 108. As previously discussed, the orientation of the fan could be reversed to reverse the direction of the air flow 118. As pointed out earlier, it is much more effective to have the fan blow air out onto a user rather blowing into the container. The handle 116 is an optional feature.

Figure 9:
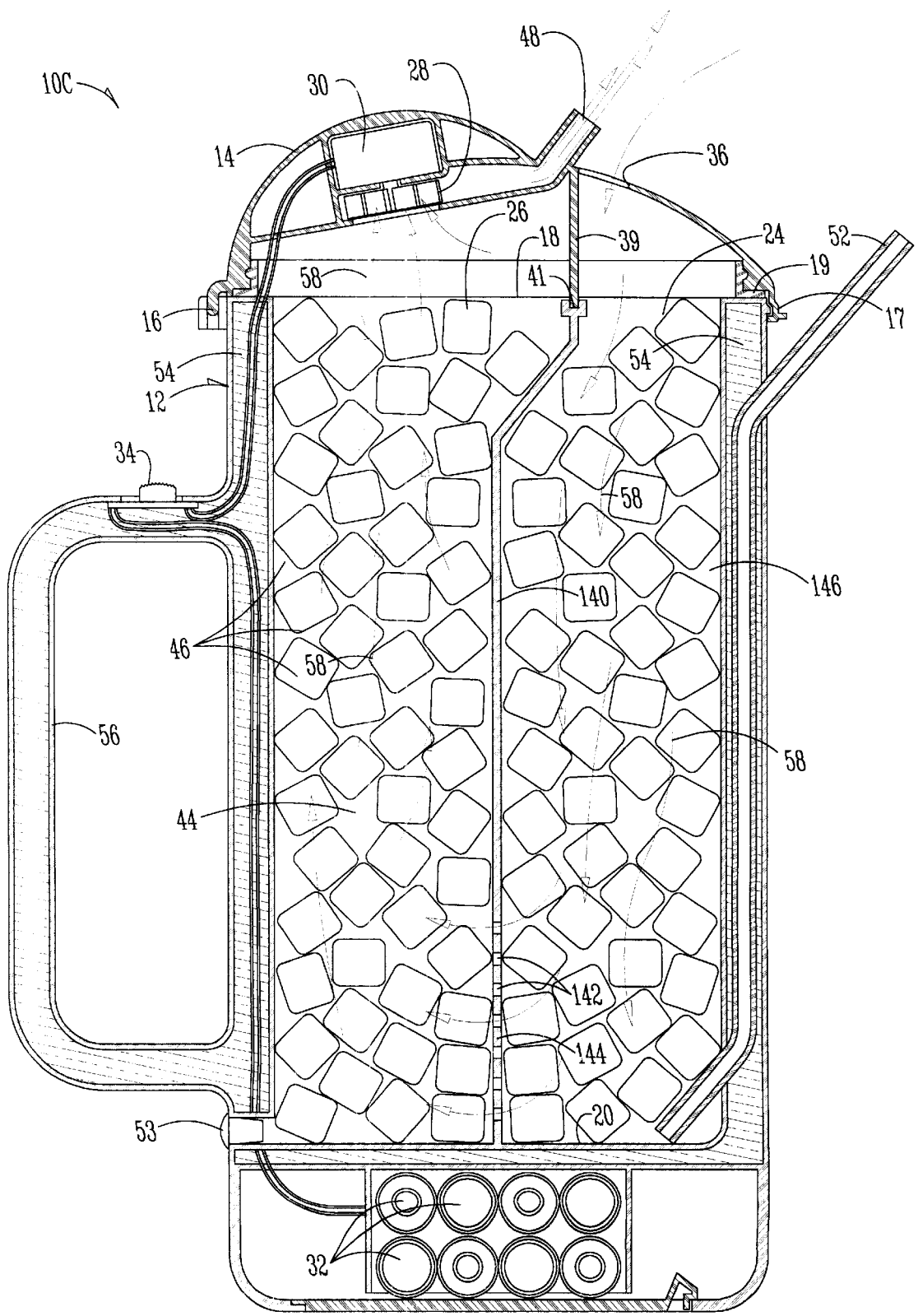
FIG. 9 is a cross-sectional view of a fifth embodiment according to the present invention.

A fifth embodiment of the present invention is shown in FIG. 9. In this embodiment, the portable air conditioner 10C has two compartments 44, 146 containing cold substances. The air flows through one compartment 44 through the vents 142 located at the bottom 144 of the separation wall 140 and out through the cool air vent 48. The bottom 144 of the separation wall 140 could be eliminated as long as some space remained between the separation wall 140 and the bottom of the container to allow air to flow. In this embodiment there is a greater amount of ice 46 which will lead to greater cooling of the air. The control of the air flow 58 is the same as that described for the embodiment shown in FIGS. 1–6.

Figure 10:
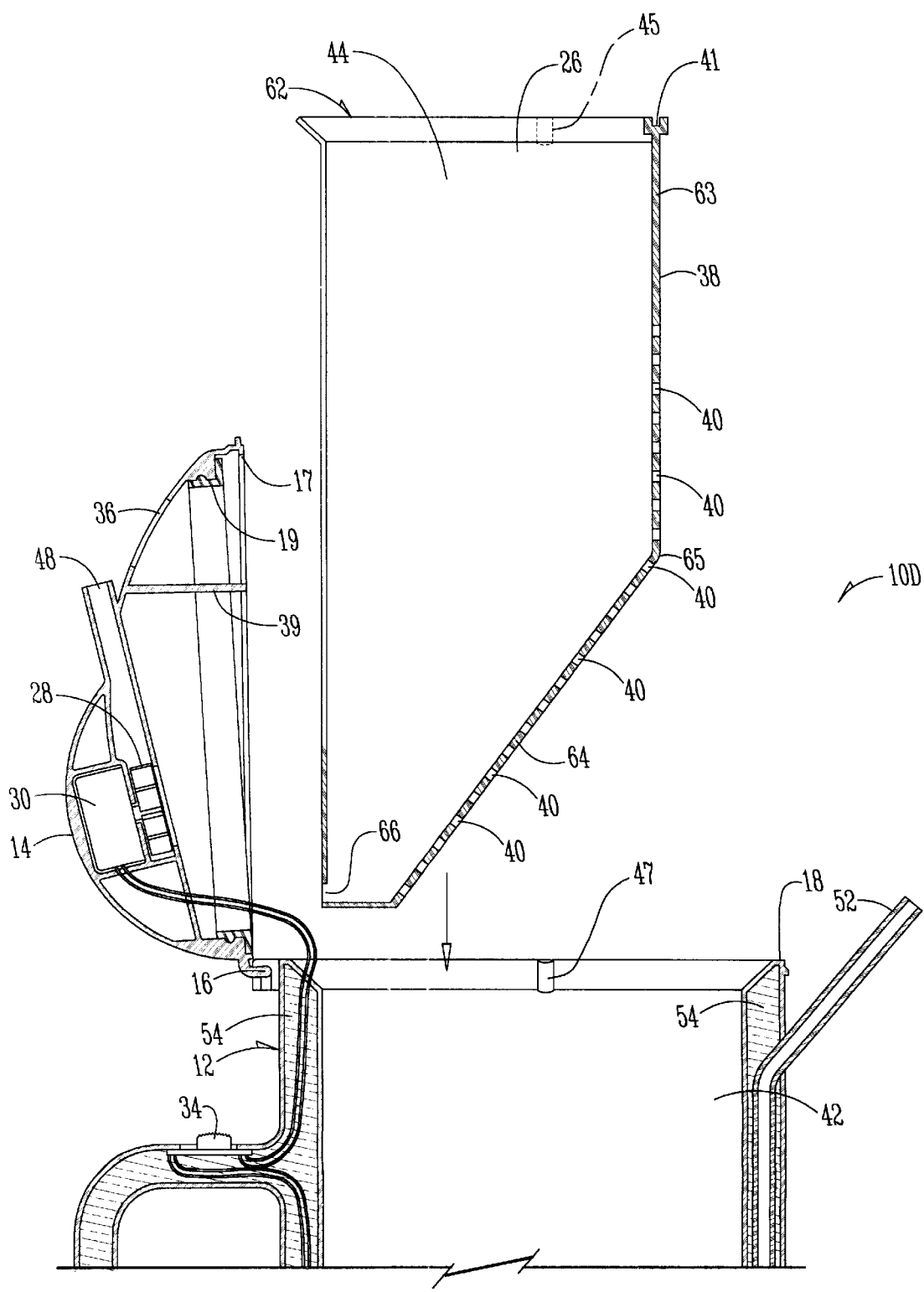
FIG. 10 is a cross-sectional view of a sixth embodiment, wherein the separation wall is part of a removable insert.

The embodiment disclosed in FIG. 10 is nearly identical to that disclosed in FIGS. 1–6. The separation wall 38 is part of a removable insert 62. The removable insert 62 makes it easier to clean both the interior of the container 12 and the separation wall 38. This feature is particularly handy for cleaning the vents 40 and removing debris that could disrupt the air flow. The insert has a hole 66 to allow liquid to pass through the insert 62 and out through the drain plug 53. The removable insert is secured to the container through a male-female groove system. The male tab 45 fits into the female groove 47. The groove system helps ensure that the insert 62 is properly aligned within the container 12. Other types of attachments could be used to secure the insert 62 in the container 12.

Figure 11:
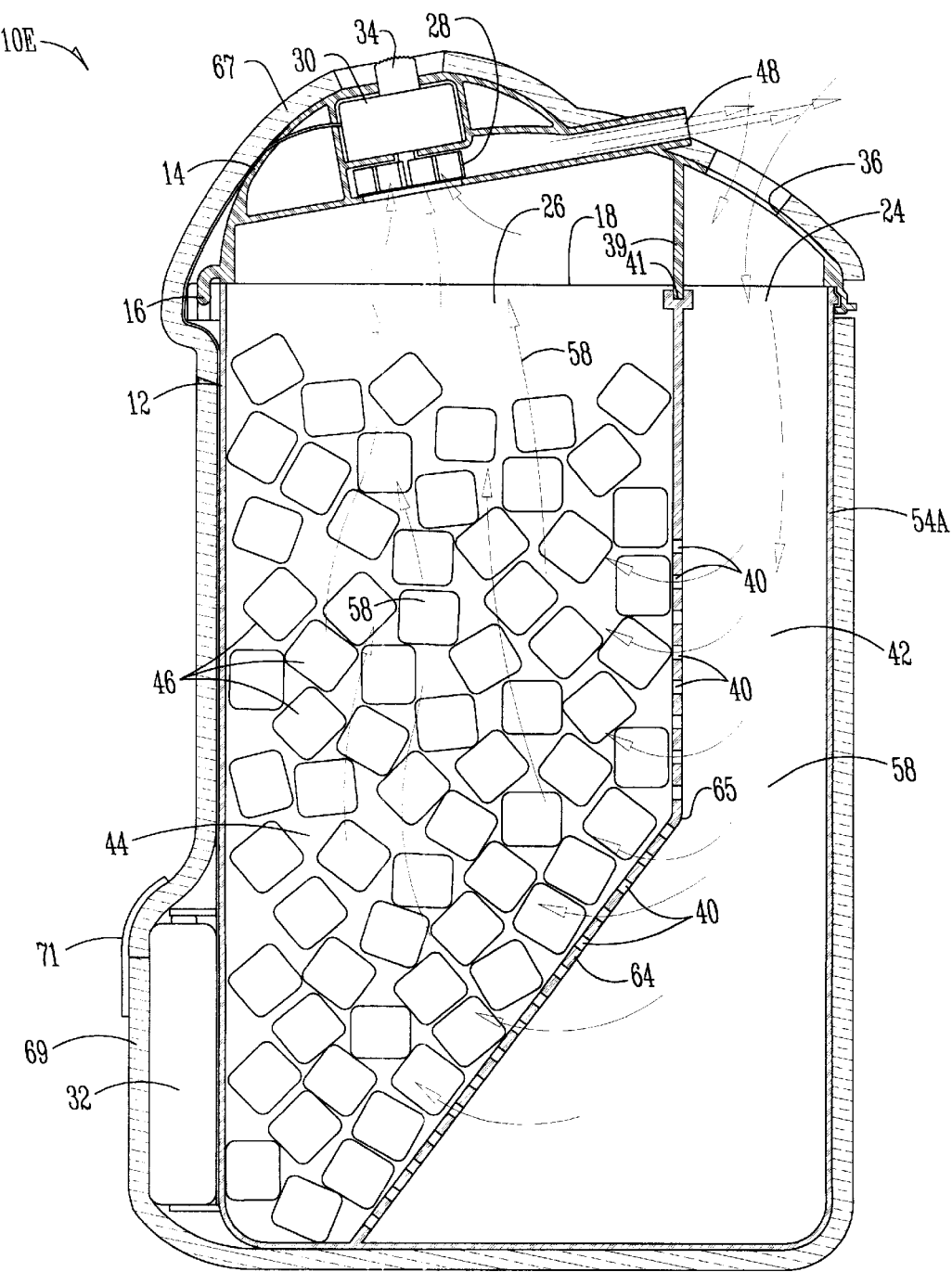
FIG. 11 is a cross-sectional view of a seventh embodiment wherein an insulating jacket encompasses the portable air conditioner.

FIG. 11 shows a cross-sectional view of a seventh embodiment according to the present invention. The side wall 54A of the portable air conditioner 10E is not insulated. Instead, an insulating jacket 67 encompasses the air conditioner 10E. The insulating jacket 67 has a zipper (not pictured) to allow for removal of the air conditioner 10E. The switch 34 protrudes through an opening in the insulating jacket 67. A pouch 69 in the insulating jacket 67 holds the battery pack 32. A VELCRO tab 71 allows for opening and closing of the pouch 69 to replace the battery pack 32. The insulating jacket 67 could also have another opening to allow a straw 52 (FIG. 1) to fit through the jacket 67.

What is claimed is:

1. A portable air conditioner, comprising:

a container having top and bottom ends, a side wall, an air intake opening, and a cool air opening;

a separation wall within the container, a first space between the separation wall and the side wall defining an air intake region, the air intake region in fluid communication with the air intake opening, a second space between the separation wall and the side wall defining a cold substance chamber;

a blower in fluid communication with the cool air outlet; and a power supply operatively coupled to the blower.

2. The portable air conditioner of claim 1, wherein the blower is a fan.

3. The portable air conditioner of claim 2, wherein the power supply is a battery.

4. The portable air conditioner of claim 1, further comprising:

a straw in fluid communication with an interior portion of the container.

5. The portable air conditioner of claim 1, further comprising:

an on/off switch between the power supply and the blower.

6. The portable air conditioner of claim 1, wherein the blower is situated so as to pull air through the air intake opening and push it out through the cool air outlet.

7. The portable air conditioner of claim 1, further comprising:

a lid connected to the top end of the container, the blower being housed within the lid, the lid having an air intake vent in fluid communication with the air intake opening, and the lid having a cool air vent in fluid communication with the blower.

8. The portable air conditioner of claim 7, further comprising:

a straw in fluid communication with an interior portion of the container.

9. The portable air conditioner of claim 7, further comprising:

a vent blocking slide piece held in a lip adjacent to the separation wall.

10. The portable air conditioner of claim 1, wherein the separation wall is part of a removable insert, the removable insert fitting inside the container.

11. The portable air conditioner of claim 7, further comprising:

rubber around the top of the container to form a seal between the container and the lid.

12. The portable air conditioner of claim 7 wherein the container is plastic.

13. The portable air conditioner of claim 12 wherein the side wall is insulated.

14. The portable air conditioner of claim 2 wherein the fan is a squirrel cage fan.

15. A portable air conditioner/beverage container, comprising:

a container having a closed bottom, a side wall, a top, an air intake opening, a cool air outlet, and a beverage opening;

a barrier wall in the interior of the container, space between the barrier wall and the side wall defining a beverage compartment;

a separation wall in the interior of the container;

a cold substance chamber in fluid communication with the cool air outlet;

an air intake region in fluid communication with the air intake opening;

a blower in fluid communication with the cool air outlet; and a power supply operatively connected to the blower.

16. The portable air conditioner of claim 15, further comprising:

a drain hole to allow water to be drained from the cold substance chamber; and a drain plug in the drain hole.

17. The portable air conditioner of claim 15, further comprising:

a straw in fluid communication with the beverage compartment.

18. The portable air conditioner of claim 15, wherein a space between the barrier wall and separation wall defines the air intake region, a space between the separation wall and side wall defines the cold substance chamber, and a space between the barrier wall and side wall defines the beverage compartment.

19. A portable air conditioner/beverage container, comprising:

a container having a closed bottom, a top, and a side wall, the top having an air intake opening and a cool air outlet;

a lid connected to the top of the container, the lid having an air intake vent and a cool air vent, the air intake vent in fluid communication with the air intake opening;

a separation wall in an interior of the container, the separation wall having holes to allow air to flow through the wall;

a first space between the separation wall and the side wall defining an air intake region, the air intake region in fluid communication with the air intake opening;

a second space between the separation wall and side wall defining a cold substance chamber, the cold substance chamber in fluid communication with the cool air outlet;

a fan housed within the lid, the fan situated to pull air through the cold substance chamber and cool air outlet, and expel it out through the cool air vent; and a power supply operatively connected to the fan.

* * * * *